United States Patent Office 3,632,822
Patented Jan. 4, 1972

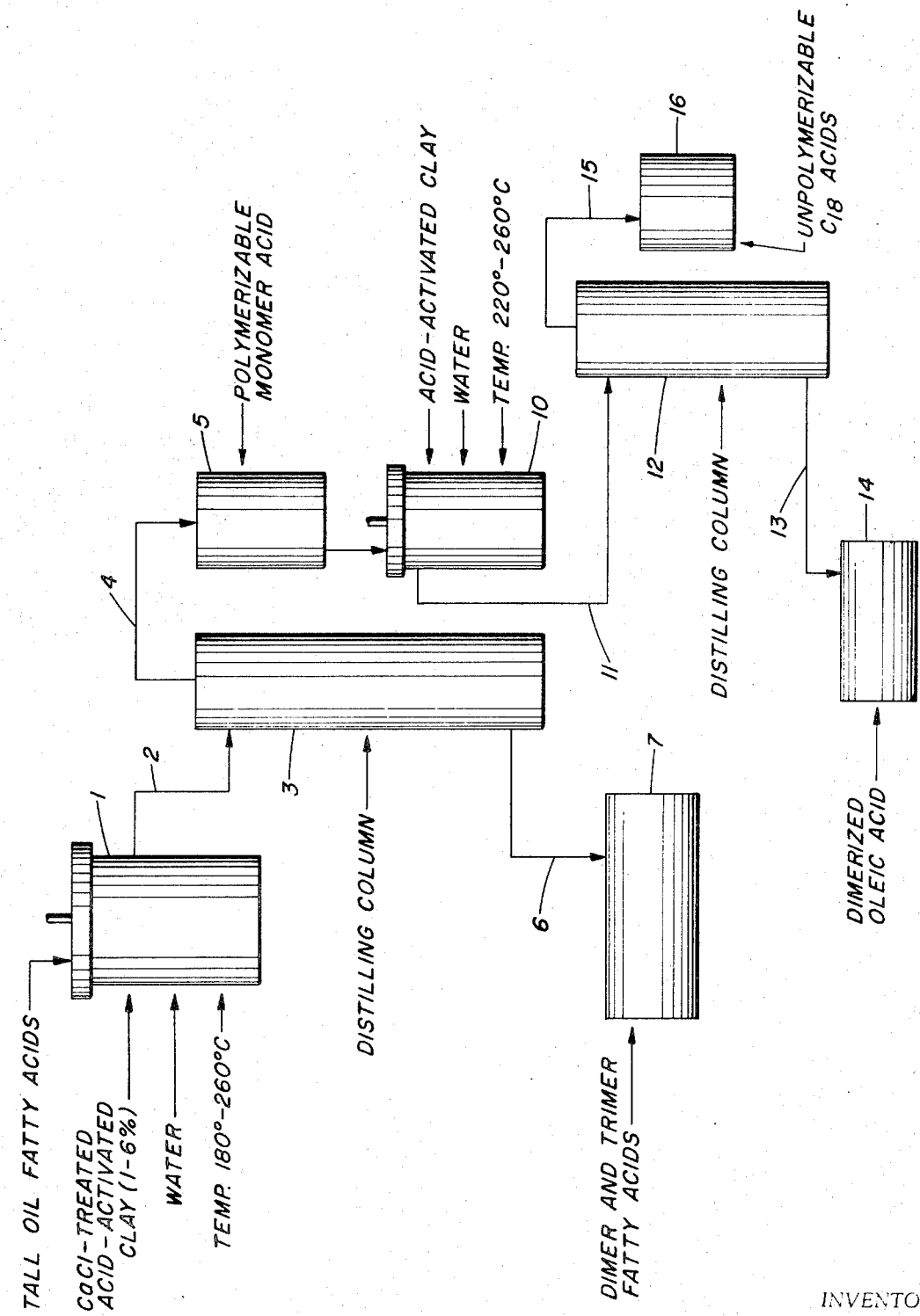

3,632,822
POLYMERIZATION OF UNSATURATED
FATTY ACIDS
Natalie Hetman Conroy, New Canaan, Conn., assignor to
Arizona Chemical Company, New York, N.Y.
Filed Feb. 4, 1969, Ser. No. 796,424
Int. Cl. C09f 7/06
U.S. Cl. 260—407
10 Claims

ABSTRACT OF THE DISCLOSURE

Mixtures of unsaturated higher fatty acids consisting predominantly of oleic and non-conjugated linoleic acids are polymerized in two stages. In the first stage, the mixture is heated at 180° C. to 260° C. in the presence of a small amount of water and an alkaline earth metal salt modified mineral clay for about 2–5 hours. Residual unpolymerized acids, principally unmodified octadecenoic acids, are separated from the reaction product and may be dimerized in a second stage by heating at 220° C.– 260° C. for about 2 to 5 hours in the presence of a small amount of water and of an acid-activated mineral clay, which is preferably a montmorillonite clay.

---

This invention relates to the polymerization of mixtures of unsaturated higher fatty acids containing both oleic acid and non-conjugated linoleic acid in the presence of moisture and of a novel acid-activated mineral clay catalyst. Its principal object is to provide a polymerization process wherein a first polymerization stage is carried out in the presence of an activated mineral clay catalyst that produces good yields of polymer acids but has little or no harmful modifying or rearranging action on the molecular structure of the remaining unpolymerized monomer acids. A further object is to provide an over-all stage polymerization process wherein the sum total of polymerized acids resulting from the two stages is substantially greater than can be obtained with the same starting mixtures in single-stage polymerization processes using presently-known activated clay catalysts. Still further objects of the invention will become apparent from the following description of preferred embodiments thereof when taken with the accompanying drawing and the appended claims.

The polymerization of unsaturated higher fatty acids has reached a high state of development. Originally, only the thermal polymerization of acids containing conjugated double bond systems was known; these are considered to be polymerized by Diels-Alder diene condensation. The acid-activated clay polymerization process, which is carried out in the presence of small amounts of water, was then developed and is described in U.S. Pats. Nos. 2,793,219 and 2,793,220. The process of my present invention is an improvement in this second type of polymerization process, as distinguished from those in which higher fatty acids containing conjugated double bond systems are polymerized simply by the action of heat.

When mixtures of unsaturated higher fatty acids such as those obtained from soya bean oil or from tall oil are polymerized by heating in the presence of water and of an acid-activated mineral clay such as montmorillonite clay, mixtures of dimer acids and trimer acids are obtained. With most unsaturated fatty acid mixtures of this type the ratio of dimer acids to trimer acids in the polymer fraction is on the order of about 2 to 1 to 3 to 1 and the overall yield of polymerized acids is between about 40% and about 60%, this yield of course being largely dependent on the proportion of mono- and polyunsaturated acids in the fatty acid mixture.

It is a characteristic of this process, however, that the activated clay catalyst modifies the molecular structure of the unpolymerized acids remaining in the reaction product in such a manner that after this modification they cannot be polymerized. This is not surprising when it is considered that the acid-activated clays, such as those sold commercially as "Filtrol," are widely used as catalysts for reforming the molecular structure of petroleum hydrocarbons. It is believed that the molecules of unpolymerized higher fatty acids are modified by these clays in much the same manner, so that they become branched-chain acids instead of straight-chain acids. Regardless of theoretical considerations, however, the fact is that the monomeric acids separated from the reaction products produced by polymerizing higher unsaturated fatty acid mixtures in the presence of previously known mineral clay catalysts cannot be further polymerized by any known polymerization procedure. This is true both of the acidic catalysts described in U.S. Pat. No. 2,793,220 and of the alkaline clays of U.S. Pat. No. 2,955,121.

My present invention is based on the discovery that a particular class of new mineral clay catalysts can be used in the above-described, previously known polymerization of unsaturated higher fatty acid mixtures, and that these new catalysts do not cause an unfavorable molecular rearrangement of the residual unpolymerized fatty acids in the reaction product. The clay catalysts which I have found to produce these unexpected results are hereafter sometimes described as alkaline earth metal salt-modified clays, since they are activated mineral clays of the base exchanging type (i.e., montmorillonite or bentonite) that have been reacted with an aqueous solution of a water-soluble alkaline earth metal salt until substantial ion exchange has occurred and the interplanar spacing of clay has increased to a thickness equivalent to at least two monomolecular layers of water. This action of water soluble alkaline earth metal salt solutions on clay has been reported in the literature; see the article by Isaac Barshad in American Minerals (1950), 225–238.

In a representative procedure, an acid-activated montmorillonite clay having a pH between about 3 and 4.5, purchased commercially under the trademark "Super Filtrol," is agitated with a 1 molar aqueous calcium chloride solution for about 1 to 10 hours or longer, after which the clay is separated from the salt solution by filtration. This procedure replaces sodium ions of the clay with calcium ions and also removes free hydrogen atoms from acid sites in the clay. For best results the clay is then preferably subjected to a second treatment with a 1 molar calcium chloride solution, and this treatment is preferably continued until the pH of the modified clay is in the range of from 5 to 7. Comparable results are obtained when other alkaline earth metal salts are employed such as the chloride, bromide, iodide or nitrate of strontium, barium or calcium.

Mineral clays of the type known as hectorite, attapulgite, montmorillonite and sepiolite are illustrative of the bentonite clays that may be used. These are treated with an acid such as sulfuric or hydrochloric acid in the well-known manner of producing acid-activated clays, such as is described in the "Encyclopedia of Chemical Technology," vol. 4, page 55. The acid treatment is preferably such as to bring the pH of the treated clays to between about 3 and 5. The clay is then subjected to the action of a water solution of an alkaline earth metal salt, and this is preferably continued until the pH has increased to a value between about 5 and 7. Strontium chloride, strontium nitrate, barium chloride, barium nitrate, calcium nitrate, calcium bromide, barium bromide, strontium bromide or calcium iodide may replace the calcium chloride which is the preferred modifying agent.

In carrying out the process of my invention, a mixture of unsaturated higher fatty acids which consists principally of non-conjugated linoleic acids and oleic acid is subjected to a first stage of catalytic polymerization in the presence of catalytic amounts of this alkaline earth metal salt-modified clay, a small amount of water on the order of about 0.5% to 5% of the weight of the fatty acids being present and sufficient pressure being used to prevent its vaporization. The quantity of modified clay catalyst (about 1% to 6% on the weight of the fatty acids), the range of polymerizing temperatures (about 180° C. to 60° C. and preferably 200° C. to 250° C.) and the reaction times (about 2 to 5 hours are not largely different from those ordinarily used with other clay-type catalysts and the yields of polymerized acids are about the same, but other results of the process are quite different. First, the unpolymerized residual fatty acids are not adversely altered by the catalyst, and can be further polymerized in a second stage. Furthermore, as a second important advantage of the invention, the ratio of dimeric acids to trimeric acids is materially increased over that obtainable with other catalysts, and is ordinarily at a ratio of at least 4 to 1. When the feed consists of tall oil fatty acids or soya acids it can be between 5 to 1 and 8 to 1. This advantage is commercially important, as the dimeric acids are much more valuable than the trimeric acids.

In this first polymerization step the linoleic acid content of the feed mixture is the most rapidly consumed reagent as the polymer acids are formed, for it is much more reactive than is oleic acid at the temperatures employed. This polymerization includes both reaction between two molecules of linoleic acid and also reaction between one molecule of linoleic acid and one of oleic acid. The dimer acid product formed in the first stage is therefore more highly unsaturated than is that from the second stage, which consists principally of oleic acid dimer, but there is nevertheless only a surprisingly low conversion of this dimer acid to trimer acids in the presence of the alkaline earth metal salt-modified clay catalysts used.

After completing the first polymerization stage in the manner described, the reaction products are separated into a polymerizate fraction and a monomer fraction. This is preferably done by vacuum distillation, with or without the use of steam. The mixed reaction products are preferably fed into a wiped film still in which the monomer fraction is vaporized and separated as distillate while the polymer fraction is collected as a liquid from the base of the still. Distillation temperatures of 180° C.–220° C., at pressures of about 0.5–50 millimeters of mercury, are preferably maintained.

The monomer fraction of the product mixture from the first stage consists principally of monounsaturated straight-chain fatty acids of 18 carbon atoms mostly oleic and elaidic acids. Since these acids are polymerizable, they are preferably subjected to a second polymerization stage in the presence of an activated clay catalyst. I have found that the best results are obtained when a straight acid-activated montmorillonite clay is used in this stage of the process, i.e., a clay that has been activated by treatment wtih acid but that has not been subjected to base exchange with an aqueous alkaline earth metal salt solution. Thus the "Super Filtrol" clay referred to above is a preferred catalyst for use in this stage of the process, although any other known or equivalent acid-activated mineral clay may be employed. The second polymerization stage, like the first, is carried out in the presence of a small amount (0.5–5%) of water and about 1% to 6% of the acid-activated clay, the polymerization temperature being preferably the same or higher than that used in the first stage. The material being polymerized in this stage consists predominantly of oleic and elaidic acids, which require at least as high a temperature for polymerizing as does the mixture of oleic and linoleic acid which was the feed to the first stage. When these conditions are observed, and when the second stage polymerization is carried out for about 2 to 5 hours, yields of dimeric acid on the order of about 35–60% or higher are obtained. Overall combined yields of polymer acids, from the two stages are therefore usually on the order of 65–75%.

The polymerized acids from the second stage are preferably separated from residual monomer by distillation, and may be either mixed with the product polymeric acids from the first stage or collected and sold as a separate product. In many cases their sale as a separate product is preferable, as they represent a relatively pure dimeric acid product containing little or no trimer acid. They are particularly well suited for conversion into polyamide resins and into polyester products for this reason; see J. Amer. Oil Chemists Society, vol. 39, pp. 534–545 (1962).

It will be evident from the foregoing description that the process of my invention can be applied to a wide variety of higher fatty acid mixtures, the only requisite being that they contain sufficient oleic and linoleic acids to justify recovery. In general, mixtures of unsaturated higher fatty acids containing about 25% to about 60% of non-conjugated linoleic acids and about 22% to about 60% of oleic acid are suitable starting materials for use in this process. Representative higher fatty acid mixtures obtainable from triglyceride oils and from commercial higher fatty acid mixtures such as tall oil, suitable for use in the process, have the compositions shown in the following table.

It will be understood that the representative yields of polymeric acid produced from the first stage, as well as the yields of dimeric acids from the second stage, will vary with the varying proportions of linoleic and oleic acids in the materials shown in this table.

TABLE I

| Fatty acids from— | Saturated $C_{12}$–$C_{20}$ | Oleic | Linoleic |
| --- | --- | --- | --- |
| Corn oil | 10.7 | 30.1 | 56.3 |
| Cottonseed oil | 27.2 | 22.9 | 47.8 |
| Peanut oil | 13.7 | 54.3 | 26.0 |
| Safflower oil | 6.0 | 32.8 | 61.1 |
| Soyabean oil [1] | 13.4 | 23.5 | 51.2 |
| Tall oil [2] | 5.5 | 51.0 | 38.5 |

[1] Also contains 8.5% linolenic and 2.4% saturated $C_{12}$–$C_{24}$ acids.
[2] Also contains 5% conjugated octadecadienoic acids.

The invention will be further described with reference to the accompanying drawing, the single figure of which is a flow sheet depicting the two-stage process as applied to a mixture of tall oil fatty acids having the composition shown in Table I. Referring to this drawing, an autoclave 1 is charged with the tall oil fatty acid mixture together with between 1% and 6% (preferably 2–4%) of a calcium chloride-treated acid-activated montmorillonite clay prepared as previously described. From 0.5% to 5% and preferably 2% of water on the weight of the tall oil fatty acids is added and the autoclave is closed and heated to 180°–260° C. and preferably about 220°–230° C. at pressure which develops autogenously at these temperatures. The heating is continued until most of the linoleic acid and part of the oleic acid have polymerized and the yield of polymer is on the order of 50–60%, based on the weight of the fatty acid mixture charged. This usually requires a heating time within the range of about 2 to 5 hours; preferred conditions being about 4 hours at 230–240° C. The contents of the autoclave are then discharged through a line 2 into a wiped film still 3 from which the unpolymerized acids are distilled overhead through line 4 and are cooled and condensed into a receiver 5. A mixture of dimeric acids and trimeric acids, which ordinarily contains at least 80% of dimer acids, is withdrawn through line 6 into a receiving tank 7.

The major proportion of the monomeric acids collected in receiver 5 are polymerizable in character, being principally the straight-chain monounsaturated acids previously described, for reasons which have been set forth above. This mixture is therefore charged into a second autoclave 10 together with from 2% to 6% and preferably about 4% of its weight of an acid-activated montmorillonite clay having a pH of about 3, such as "Super Filtrol" together with about 0.5%–5% and preferably about 2% of water. The autoclave 10 is then heated to a polymerization temperature between about 220° C.–260° C., preferably 240° C. and under the pressure autogenously developed, for about 2–5 hours, after which it is cooled and the contents are withdrawn through line 11 and separated in a still 12. The resulting dimer acids, which consist principally of dimeric oleic acids, are withdrawn from the column through line 13 into a product storage tank 14 and are obtained in yields of about 35–60%, based on the weight of the monomer acids charged from the receiver 5. The remaining monomer acids are withdrawn overhead through line 15 and condensed into a receiver 16; these acids are unpolymerizable by reason of their molecular rearrangement into branched-chain acids caused by the acid-activated clay.

To determine the relative amounts of the several components present in the foregoing mixtures, a gas chromatography procedure is employed. Typical of one such procedure is a method described in Analytical Chemistry, vol. 33, at page 363. In brief, the reaction mixture comprising monomeric and polymeric fatty acids is converted to the corresponding methyl esters employing boron trifluoride and methyl alcohol reagents. A standard, such as di(2-ethylhexyl)sebacate, is added and the mixture is programmed from 200° C. to 325° C. through a 12" column which contains 5% silicone grease on a 60/80 mesh inert support such as "Chromosorb W." The inlet temperature of the apparatus is maintained at 330° C. and the detector temperature is set at 300° C. Reaction mixture, which contains monomeric esters, dimeric acid esters, other polymeric acid esters, as well as di(2-ethylhexyl)sebacate are injected into the apparatus. The monomeric and dimeric esters and the di(2-ethylhexyl)sebacate pass through the aforementioned column. Monomeric fatty acids and dimeric fatty acids in percent are calculated from the standard sebacate ester. Trimeric and other polymeric fatty acids are calculated by difference.

The following examples will illustrate the invention in still greater detail. It should be understood, however, that although these examples may describe certain specific and preferred features of the invention they are to be regarded primarily as illustrative in characteristics, the invention in its broad aspects not being limited thereto.

EXAMPLE 1

To a suitable reaction vessel are added 20 parts of acid-activated montmorillonite clay (available under the trademark "Super Filtrol" of the Filtrol Corporation) and 200 parts of a 1 molar aqueous calcium chloride solution. Stirring the mixture for 16 hours, removal of the clay from the water is effected by filtration and the so-treated clay is next treated for an additional four hours with 200 parts of a 1 molar calcium chloride solution. Again the clay is filtered and the resultant calcium chloride modified, acid-treated montmorillonite clay of pH 5 is air dried.

Into a rocking-type autoclave containing 100 parts of tall oil fatty acids having an iodine value of 129 and an acid number of 198 are added 4 parts of the above-prepared calcium chloride treated clay. Thereafter, 2 parts of water are added and the mixture is heated for four hours at 240° C. under autogenous pressure. After cooling and separating the catalyst by filtration, analysis of the resultant mixture for monomer and polymer content by the above-described gas chromatography method demonstrates a yield of 57% polymeric acids and 43% of a monomeric acid fraction. Separation of the monomeric acid fraction from the polymeric acid fraction is next readily accomplished by vacuum distillation at a temperature of 190° C. and a pressure of 1 mm. Hg. The distillate fraction is subjected to a pH 3 acid-treated montmorillonite clay polymerization to yield an additional 44% of dimer and other higher fatty acid, based on the monomer fraction so treated. The ratio of dimer to trimer in the final mixture of polymeric fatty acids from the second polymerization is found to be 5 to 1.

Similar results are obtained utilizing barium nitrate or strontium iodide in lieu of calcium chloride to effect modification of the acid-treated clay.

EXAMPLE 2

Repeating the above procedure in every respect, but substituting the same quantity of "Super Filtrol" for the calcium chloride modified mineral clay in the initial polymerization step, the reaction mixture analyzes by gas chromatography about 35.6% monomeric acids and 40.2% dimeric acids in admixture with about 20% trimer and higher polymeric fatty acids. Although about 60% of the reaction mixture contains polymeric fatty acids, the ratio of dimeric acids to trimeric acids is about 2 to 1.

The monomer acids recovered from the procedure of this example cannot be subsequently polymerized because their molecular structure was rearranged by the acid-treated clay catalyst.

EXAMPLE 3

The difference between the unrearranged octadecenoic acids obtained as distillate from the first polymerization step of Example 1 and the rearranged monomer acids produced in Example 2 can be demonstrated by gas chromatography as follows:

The monomer distillates were converated to their methyl esters and were separated by injection into a chromatograph in which the inert carrier was coated with 20% diethylene glycol succinate as the absorbent. The volatile monomer esters were adsorbed and desorbed on the succinate, whereupon like esters concentrated into peaks which were detected by their thermal conductivity at the exit. These peaks were recorded against time. A peak is identified by its retention time relative to a known peak, in this case methyl stearate. These are expressed as relative retention ratios, which identify the material. Its quantity is calculated from the area under the curve. The results are tabulated as follows, methyl stearate being taken as unity.

| Compound | Relative retention ratio | Monomer composition | |
|---|---|---|---|
| | | Acid clay run, percent | CaCl₂ clay run, percent |
| Low boilers | | 2.7 | 3.8 |
| Methyl palmitate | 0.56 | 4.5 | 0.6 |
| Methyl palmitoleate | 0.69 | 3.7 | 0.7 |
| Not identified | 0.73 | 12.0 | |
| Do | 0.78 | | 2.6 |
| Rearranged ester [1] | 0.84 | 25.7 | |
| Do [1] | 0.89 | 4.6 | 1.5 |
| Methyl stearate [2] | 1.00 | 22.4 | 6.3 |
| Methyl oleate | 1.19 | 16.3 | 74.2 |
| Not identified | 1.29 | | 7.4 |
| Methyl linoleate | 1.40 | 4.4 | 2.5 |
| High boilers | | | 0.6 |

[1] Esters of unpolymerizable (i.e., branched-chain) acids.
[2] Standard of comparison.

These results show that the monomer from the calcium chloride-treated clay run contains mainly acids which are readily polymerized, while the monomer from the acid clay run contains only a minor amount of these acids and thus cannot be polymerized. The difference is seen in the contents of compounds of relative retention rates 0.84 and 0.89, which appear to be rearranged, non-linear acids which cannot be dimerized, and the appreciably higher stearic acid content in the monomer from the activated clay.

EXAMPLE 4

This example illustrates an in situ clay modification procedure. There is no pretreatment of the "Super Filtrol."

In a rocking-type autoclave containing 20 parts of tall oil fatty acids having an iodine value of 129 and an acid number of 198, and 4 parts of acid-activated montmorillonite clay are added 2 parts of a 1 molar aqueous calcium chloride solution. The reaction mixture is then agitated for 4 hours at 230° C. and maintained at a pressure of about 150 lbs. per square inch. This pressure is developed autogenously at the latter temperature. After the reaction mixture is cooled to about 125° C. and removed from the autoclave, it is filtered and the filtrate is examined by gas chromatography. There is obtained a composite comprising 49% monomer and 43% dimeric acids along with 8% trimer. Again the ratio of dimer to trimer fatty acids is approximately 5 to 1, respectively.

The reaction mixture is separated by vacuum distillation and resultant monomeric fatty acid mixture, containing almost no rearranged and therefore unpolymerizable acids, is subjected to further polymerization by treatment with acid-treated montmorillonite of pH 3.5. This is performed by heating the mixture to a temperature between 230° C. and 235° C. to obtain a final mixture containing 56.2% monomer, 37.1% dimer and 6.7% trimer, based on the latter treated monomeric mixture. The overall yield of the latter polymeric fatty acid fraction, based on all the monomeric fatty acids employed, is 75.7%.

Advantageously, the second polymerization step employing the distilled monomeric fraction resulting from the initial polymerization illustrates that dimeric acids are present in substantial excess relative to trimeric and higher polymeric fatty acids.

Substituting soya-bean fatty acids for the tall oil fatty acids in the above procedure, similar results are obtained.

EXAMPLE 5

To a suitable autoclave containing 20 parts of tall oil fatty acids having an iodine value of 129 and an acid number of 198 are added 4 parts of a strontium nitrate-treated, acid-activated montmorillonite catalyst, the latter being prepared by treating acid-activated montmorillonite with a 1 molar aqueous strontium nitrate solution. The reactor is heated to 240° C. for 4 hours and the reaction mixture analyzed by gas chromatography indicates that 55.8% monomer and a mixture containing 36.0% dimer and 8.2% trimer and higher polymerization material are present in the said reaction mixture. The mixture is then distilled under vacuum to separate monomeric fatty acids. Vacuum distillation is carried out preferably at a temperature of 190° C. and a pressure of 1 mm. Hg.

The resultant monomer is then treated with acid-activated montmorillonite per se at a temperature of 240° C. for an additional 4 hours. There is recovered as indicated by gas chromatography by an overall yield of dimer and trimer in a ratio of 4.5 to 1, respectively. This amounts to 76% based on the treated monomeric unsaturated tall oil fatty acids.

EXAMPLE 6

The procedure of Example 1 is carried out in every detail with respect to the initial polymerization step except that the calcium chloride treated clay catalyst is omitted. Upon completion of this step, less than about 5% by weight of dimeric acids and other higher polymeric fatty acids are detected.

What is claimed is:
1. A method of polymerizing a mixture of unsaturated higher fatty acids consisting predominantly of oleic and non-conjugated linoleic acids which comprises heating said mixture in the presence of about 0.5% to 5% of water at polymerizing temperatures within the range of about 180° C. to 260° C. and in admixture with catalytic amounts of an alkaline earth metal salt-modified clay until about 40% to about 60% of said acids have polymerized, said clay being the product obtained by reacting an acid-activated mineral clay with an aqueous alkaline earth metal salt solution until substantial base exchange has occurred and the interplanar spacing to the clay has increased, and separating from the resulting reaction product a polymerizate fraction having a ratio of dimer acids to trimer acids of at least 4 to 1 and a monomer fraction wherein most of the monounsaturated acids are octadecenoic acid capable of polymerization.

2. A method according to claim 1 in which the alkaline earth metal salt is an alkaline earth metal halide.

3. A method according to claim 1 wherein the monomer fraction is polymerized by adding about 0.5% to 5% of water and about 1% to 6% of acid-activated clay and heating at about 220° C. to 260° C. for about 2 to 5 hours.

4. A method according to claim 3 wherein the reaction product is separated by distillation into a dimer acid fraction and a fraction consisting principally of non-polymerizable isomers of oleic acid.

of higher fatty acids is soya fatty acid.

5. A method according to claim 1 wherein the mixture of higher fatty acids is tall oil fatty acids.

6. A method according to claim 1 wherein the mixture

7. A method of polymerizing a mixture of unsaturated higher fatty acids containing about 25% to about 60% of non-conjugated linoleic acid and about 22% to about 60% of oleic acid which comprises heating said mixture in the presence of about 0.5% to 5% of water at polymerizing temperatures within the range of about 180° C. to 260° C. and in admixture with catalytic amounts of an alkaline earth metal salt-modified clay until a major proportion of the linoleic acid and part of the oleic acid have polymerized, said clay being the product obtained by reacting an acid-activated montmorillonite clay with an aqueous alkaline earth metal salt solution until substantial base exchange has occurred and the interplanar spacing of the clay has increased, separating from the reaction product a polymerizate fraction and a monomer fraction wherein most of the monounsaturated acids are polymerizable octadecenoic acids, and polymerizing said acids by heating them at polymerizing temperatures in the presence of an acid-activated clay.

8. A method according to claim 7 wherein the mixture of higher fatty acids is soya fatty acids.

9. A method of polymerizing tall oil fatty acids which comprises heating said acids in the presence of about 0.5% to 5% of water at polymerizing temperature within the range of about 200° C. to 250° C. for about 2 to 5 hours in admixture with about 1% to 6%, based on the weight of said acids, of a clay product obtained by reacting an acid-activated montmorillonite clay with an aqueous alkaline earth metal salt solution until substantial base exchange has occurred and the interplanar spacing of the clay has increased, and separating from the resulting reaction product a polymerizate fraction having a ratio of dimer acids to trimer acids of at least 4 to 1 and a monomer fraction wherein most of the monounsaturated acids are octadecenoic acids capable of polymerization.

10. A method according to claim 9 wherein the monomer fraction is polymerized by adding about 0.5% to 5% of water and about 1% to 6% of acid-activated montmorillonite clay and heating at about 220° C. to 260° C. for about 2 to 5 hours and is then separated by distillation into a dimer acid fraction and a fraction consisting principally of non-polymerizable isomers of oleic acid.

References Cited
UNITED STATES PATENTS

| | | | |
|---|---|---|---|
| 3,422,124 | 1/1969 | Milks et al. | 260—407 |
| 3,412,039 | 11/1968 | Miller | 260—407 X |
| 3,150,784 | 8/1963 | Goebel | 260—407 |

FOREIGN PATENTS

| | | | |
|---|---|---|---|
| 973,616 | 10/1964 | Great Britain. | |
| 666,544 | 7/1963 | Canada | 260—407 |

LEWIS GOTTS, Primary Examiner

C. L. MILLS, Assistant Examiner

U.S. Cl. X.R.

260—97.5

UNITED STATES PATENT OFFICE
CERTIFICATE OF CORRECTION

Patent No. 3,632,822          Dated  January 4, 1972

Inventor(s) Natalie Hetman Conroy

It is certified that error appears in the above-identified patent and that said Letters Patent are hereby corrected as shown below:

Column 3, line 11, "60° C." should read -- 260° C. --; line 12, after the word "hours" insert -- ) --. Column 6, line 46, "percen" should read -- percent --. Column 8, line 14, cancel "of higher fatty acids is soya fatty acid."; line 17, after "mixture" insert -- of higher fatty acids is tall oil fatty acids. --.

Signed and sealed this 15th day of August 1972.

(SEAL)
Attest:

EDWARD M. FLETCHER, JR.
Attesting Officer

ROBERT GOTTSCHALK
Commissioner of Patents